(12) United States Patent  
Delevoye (10) Patent No.: US 7,404,325 B2
(45) Date of Patent: Jul. 29, 2008

(54) MICRO-MACHINED VIBRATING STRUCTURE AND ASSOCIATED MICRO-GYROSCOPE

(75) Inventor: Elisabeth Delevoye, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 30 days.

(21) Appl. No.: 10/582,344

(22) PCT Filed: Dec. 13, 2004

(86) PCT No.: PCT/FR2004/003203

§ 371 (c)(1),
(2), (4) Date: Jun. 9, 2006

(87) PCT Pub. No.: WO2005/061991

PCT Pub. Date: Jul. 7, 2005

(65) Prior Publication Data

US 2007/0095161 A1   May 3, 2007

(30) Foreign Application Priority Data

Dec. 19, 2003   (FR) .................................. 03 14973

(51) Int. Cl.
*G01P 9/04* (2006.01)
(52) U.S. Cl. ..................... 73/504.13; 331/154
(58) Field of Classification Search .............. 73/504.12, 73/504.13; 331/154
See application file for complete search history.

(56) References Cited

U.S. PATENT DOCUMENTS

| 2,544,646 | A | * | 3/1951 | Barnaby et al. | ........... 73/504.15 |
| 4,655,081 | A | * | 4/1987 | Burdess | ................... 73/504.13 |
| 4,759,220 | A | * | 7/1988 | Burdess et al. | ........... 73/504.13 |
| 4,793,195 | A | * | 12/1988 | Koning | ....................... 74/5.6 D |
| 5,656,777 | A | * | 8/1997 | Petri et al. | ............... 73/504.12 |
| 6,151,964 | A | * | 11/2000 | Nakajima | ................ 73/504.13 |

FOREIGN PATENT DOCUMENTS

| EP | 0 904 522 A | 3/1999 |
| EP | 1 126 242 A | 8/2001 |
| WO | WO 02/057728 A | 7/2002 |

OTHER PUBLICATIONS

Maenaka et al.; "A study of silicon angular rate sensors using anisotropic etching technology"; *Sensors and Actuators*; vol. A43; No. 1/3; May 1, 1994; pp. 72-77.

* cited by examiner

*Primary Examiner*—John E Chapman
(74) *Attorney, Agent, or Firm*—Oliff & Berridge, PLC (57) ABSTRACT

The invention relates to a micro-machined, vibrating structure (4), comprising a fixing end (5), connected to a fixed support (6) and a hollow shell, preferably in a cylindrical form with a lateral wall (7), forming a vibrating wall (7) of the vibrating structure (4), in which progressive or stationary waves are generated. The hollow shell comprises a base (8), forming the fixing end (5) for the vibrating structure (4) and a free end (9). A naturally decoupled region is arranged between the fixing end (5) and the free end (9) of the hollow shell.

31 Claims, 8 Drawing Sheets

MICRO-MACHINED VIBRATING STRUCTURE AND ASSOCIATED MICRO-GYROSCOPE

BACKGROUND OF THE INVENTION

The invention relates to a micro-machined vibrating structure comprising a fixing end, connected in secured manner to a fixed support, and at least one vibrating wall, in which progressive or stationary waves are generated and comprising a base and a free end, the vibrating wall being formed by a side wall of a hollow shell.

The invention also relates to a micro-gyroscope using such a vibrating structure.

STATE OF THE ART

Vibrating resonators are used in widely varying fields, such as sensors or actuators. A vibrating structure forms the main element of a vibrating resonator and comprises fixing means for fixing to a fixed support. In known vibrating structures, these fixing means cause an energy loss in the fixed support and can for example generate a disturbance of the motion, which reduces the performances of the vibrating resonator. By means of a specific three-dimensional design of the vibrating structure, the deformation energy can be concentrated towards one end of the structure, called the free end. The dimensioning design is studied such as to make the deformation amplitude progressively decrease from the free end to the fixing end of the structure. A part of the vibrating structure, close to the fixing end, can be assimilated to a non-punctual deformation node remaining invariant in rotation and forming a decoupling zone on which the fixing means can be placed. In this way, the disturbances which affect the fixing means are not transmitted to the wave system generated by the vibration. The fixing zone is therefore naturally decoupled from the vibrating structure.

The performances of a vibrating resonator partially determine the performances of the equipment in which it is used. The main qualities of a resonator are as follows:
- mastering the vibration modes and the purity of the resonance frequencies, which implies symmetry and manufacturing control constraints of the vibrating structure,
- insensitivity to external disturbances, which assumes vibrating structures with perfect anti-symmetrical configurations or symmetrical configurations,
- a quality coefficient (fineness of frequency response and high gain), obtained by associating the decoupling function between the fixed support and the vibrating structure,
- insensitivity to environment parameters, which implies vibrating structures with fixing means presenting a good ability to minimize environment variation effects.

It has been proposed to use a vibrating resonator as a gyroscope. Numerous documents concern gyroscopes, in particular design calculation of their dimensions and assessment of their performances. The principle of a gyroscope is the same whatever its shape. When the vibrating structure of the gyroscope is made to rotate, a Coriolis force is exerted on the vibrating walls of the structure and then modifies its state of equilibrium. This Coriolis force results from the velocity of the wave and the speed of rotation to be measured. Perfect symmetry of the vibrating structure enables a second mode to be had, for each resonance mode, equivalent to 45 degrees from the first. The resonator excitation and detection modes are therefore perfectly coupled and excited at their resonance frequency.

Figure 1:
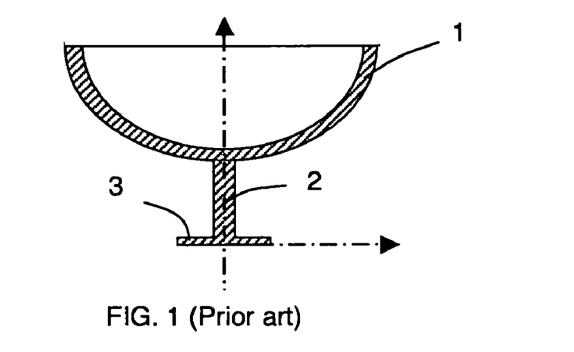
FIGS. 1 to 3 represent two vibrating structures according to the prior art in cross-section (FIGS. 1 and 3) and in top view (FIG. 2).
Figure 2:
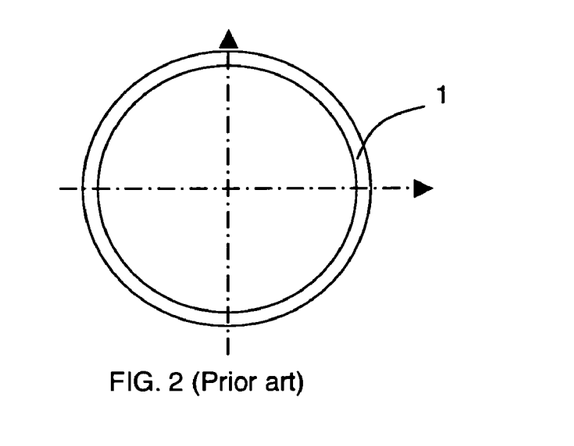

FIGS. 1 and 2 respectively represent, in cross-section and in top view, the vibrating structure that currently gives the best performances for a gyroscope, on account of its perfect symmetry and specific dimensioning. This is the HRG (Hemispherical Rate Gyro) vibrating structure, based on the stemmed glass principle. It is composed of a vibrating body 1 in the form of a hollow half-sphere, fixed on a foot 2 securely connected to a fixed support 3. The advantages of such a geometry are the following:
- the three-dimensional revolution shape is favourable to generation of stationary waves that are easy to calculate and stabilize,
- the hemispherical shape of the vibrating body 1 creates an absolute deformation node at the fixing of the structure, which is the only specific node to remain invariant in rotation.

The vibrating body 1 of this structure is therefore constantly and naturally decoupled from its fixed support 3, due to the presence of the foot 2. However, this vibrating structure is not suitable for micro-machining technologies. Particularly for manufacture of a micro-gyroscope, precise machining of a half-sphere is complex and costly in standard machining and impossible in micro-machining.

Figure 3:
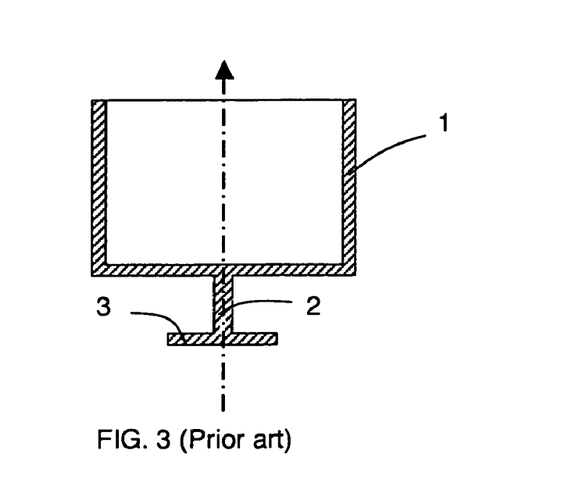

The document WO-A-9922203 describes a vibrating structure based on a similar principle but with a hollow vibrating body 1 of cylindrical shape (FIG. 3) fixed to the foot 2. The wall of the vibrating body 1 is then perfectly vertical. This structure is advantageous from the technological point of view as micro-machining a cylinder is easy.

However, the performances of a cylindrical vibrating structure supported by a foot are not satisfactory as they do not approach the optimum performances of the hemispherical vibrating structure according to FIG. 1. This type of gyroscope with a vibrating structure of cylindrical shape is therefore interesting in terms of micro-machining, but not in terms of resonator performances.

OBJECT OF THE INVENTION

The object of the invention consists in producing a vibrating structure not presenting these drawbacks and, in particular, a vibrating structure suitable for micro-machining technologies and enabling natural decoupling to be ensured, in terms of wave propagation, between the vibrating wall and the fixing part.

According to the invention, this object is achieved by the appended claims and, more particularly, by the fact that the fixing end is formed by the base of the hollow shell, a naturally decoupled zone being situated between the fixing end and the free end of the vibrating wall.

The invention also relates to a micro-gyroscope comprising one such vibrating structure, and comprising electrodes formed in the same substrate as the vibrating wall of the vibrating structure.

BRIEF DESCRIPTION OF THE DRAWINGS

Other advantages and features will become more clearly apparent from the following description of different particular embodiments of the invention given as non-restrictive examples only and represented in the accompanying drawings, in which.

DESCRIPTION OF PARTICULAR EMBODIMENTS

According to the invention, the vibrating structure of a micro-gyroscope based on progressive and stationary waves has a specific geometry. The vibrating structure, particularly suitable for micro-machining technologies, is designed such as to comprise a naturally decoupled zone in which little energy is dissipated. The fixing means are localized in this zone so as to avoid them influencing the behaviour of the vibrating structure. The foot of the vibrating structures according to the prior art is thus eliminated.

Figure 4:
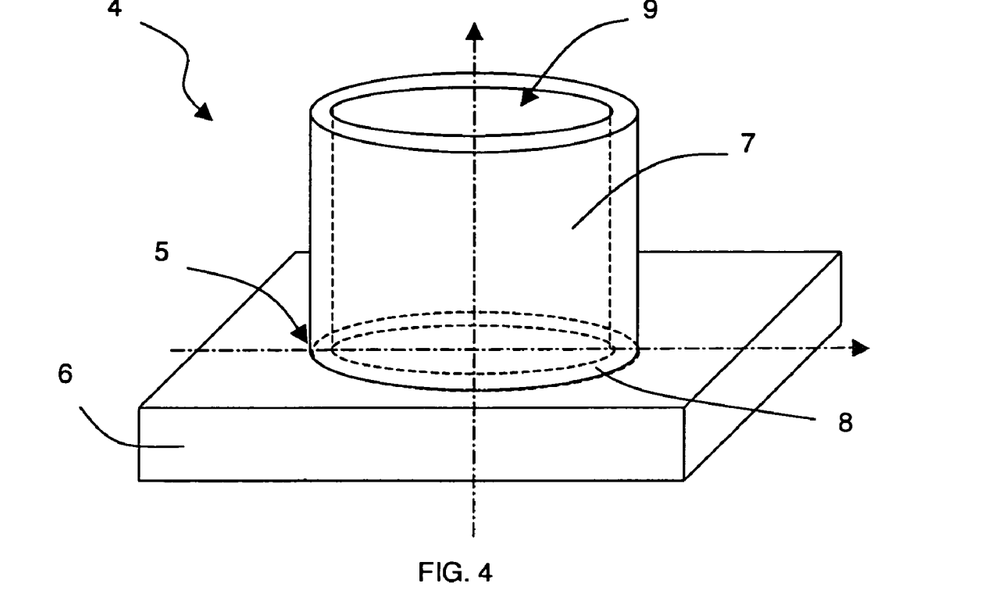
FIGS. 4 and 5 represent a particular embodiment of a vibrating structure according to the invention, respectively in perspective and in vertical cross-section.

FIG. 4 represents a particular embodiment of a vibrating structure according to the invention. The vibrating structure 4 comprises a fixing end 5 secured to a fixed support 6 and a vibrating wall 7, with a base 8 and a free end 9. The vibrating wall 7 is formed by a hollow shell of cylindrical shape. The base 8 of the hollow shell forms the fixing end 5 of the vibrating structure 4. Progressive or stationary waves are generated on the useful part of the vibrating wall 7. Unlike known vibrating structures illustrated in FIGS. 1 to 3, the vibrating structure 4 does not comprise a foot. It comprises a naturally decoupled zone at the level of the fixing end 5 of the vibrating wall 7, obtained by dimensioning of the vibrating wall 7.

Figure 5:
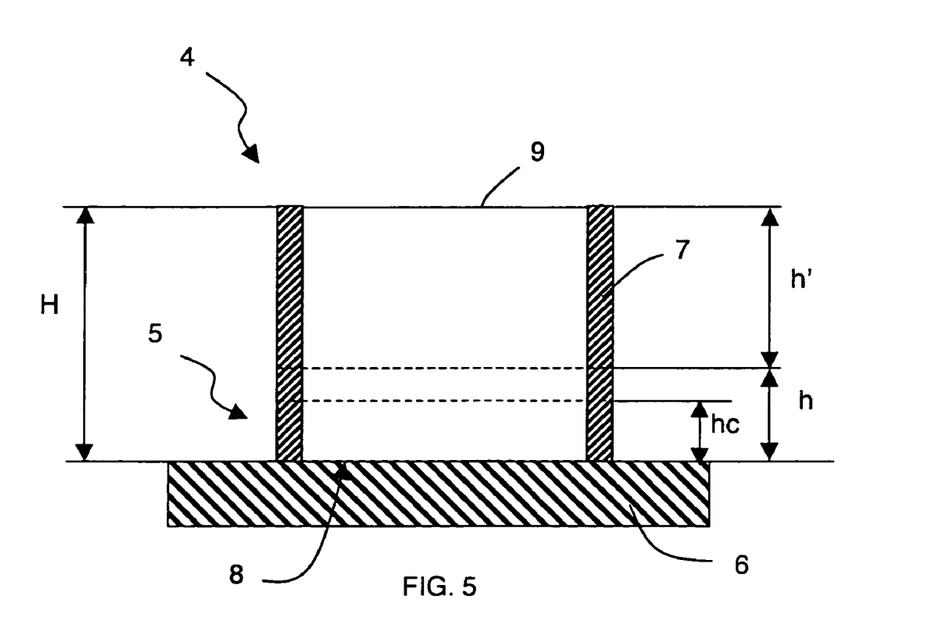

FIG. 5 illustrates this particular design of the vibrating wall 7. It represents a vertical cross-sectional view of the vibrating structure 4 according to FIG. 4. The vibrating wall 7 has a height H, whereas the useful part of the vibrating wall 7, in which the waves are generated and analyzed, has a height h'. The fixing part, corresponding to the naturally decoupled zone, has a height h (h+h'=H). The smaller the height h, the larger the height h' and the more the vibration characteristics are improved. However the height h must always be greater than a height hc, corresponding to the height of the zone of influence of the stresses generated by the fixed support 6. Indeed, the smaller the height h, the less the useful part is decoupled from the fixed support 6 and the more the vibration is liable to be disturbed. The dimensions of the vibrating wall 7 therefore have to be chosen to optimize the performances of the vibrating structure 4.

Figure 11:
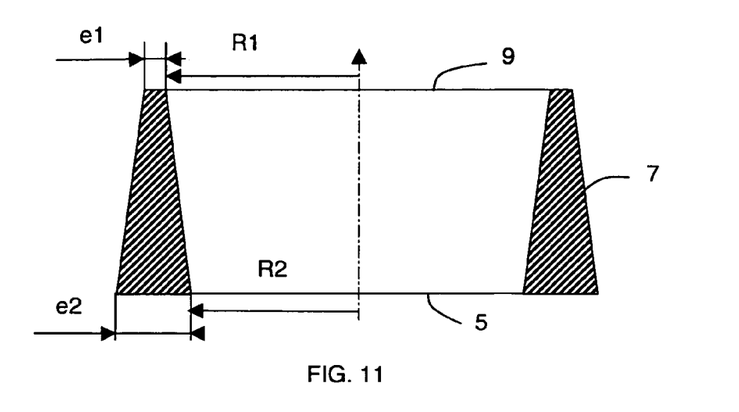
Figure 12:
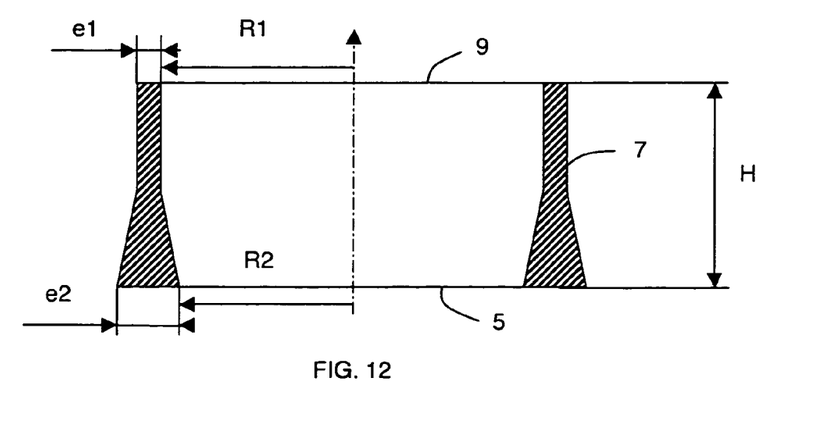
Figure 13:
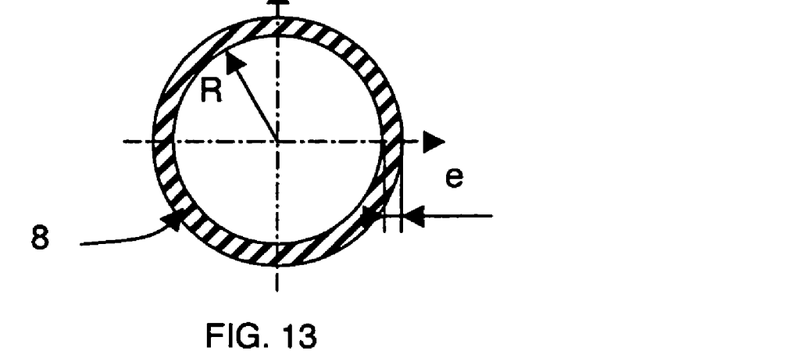
FIGS. 13 to 15 are cross-sectional views of three alternative embodiments of the base of the vibrating wall according to FIGS. 6 to 12.

Other alternative embodiments are illustrated in FIGS. 6 to 13, which represent, in cross-section, different forms of a vibrating wall 7 the base 8 whereof has a circular internal cross-section (FIG. 13).

Figure 6:
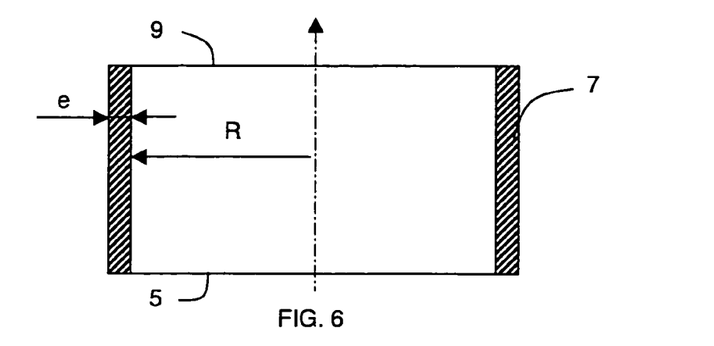
FIGS. 6 to 12 are cross-sectional views of different embodiments of the vibrating wall of a vibrating structure according to FIGS. 4 and 5.

In FIG. 6, the vibrating wall 7 has a cylindrical shape, the thickness e of the vibrating wall 7 remaining constant from the free end 9 to the fixing end 5.

Figure 7:
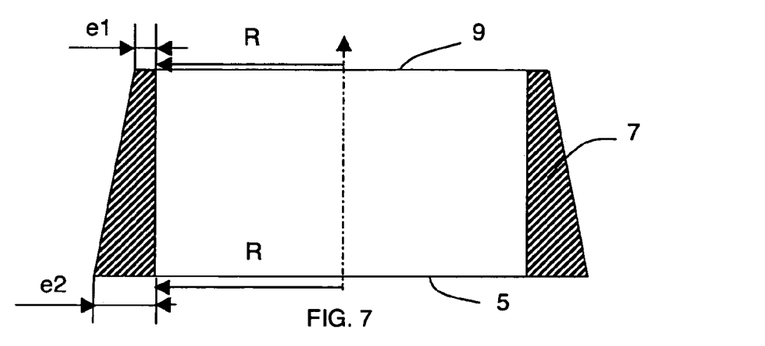

FIG. 7 represents a vibrating wall 7 having a truncated conical external face. The internal radius R of the hollow shell remains constant (the internal face of the vibrating wall 7 is therefore of cylindrical shape) and the thickness e of the vibrating wall 7 increases from a first value e1 at the free end 9 to a second value e2, greater than e1, at the fixing end 5.

Figure 8:
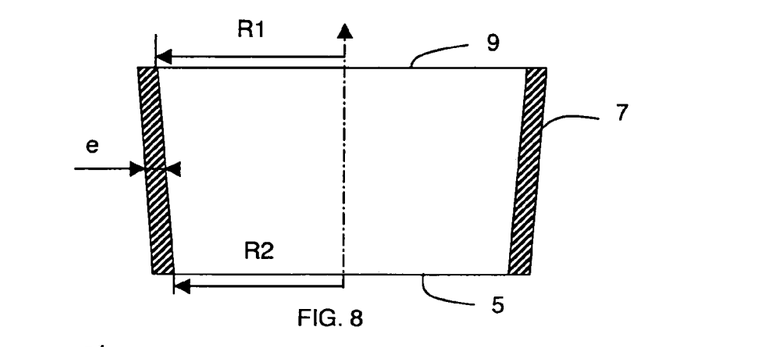

In the alternative embodiment according to FIG. 8, the vibrating wall 7 is of truncated conical shape with a constant thickness e. The internal radius R of the vibrating wall 7 decreases from a first value R1 at the free end 9 to a second value R2, smaller than R1, at the fixing end 5.

Figure 9:
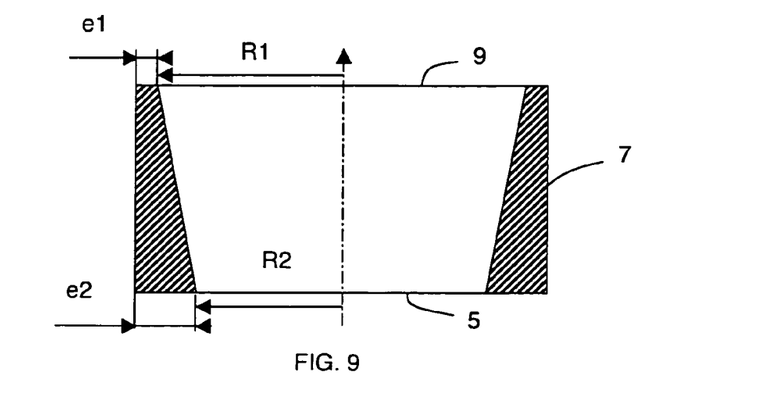

FIG. 9 represents a vibrating wall 7 of cylindrical external shape with a truncated conical internal face. The thickness e of the hollow shell increases from a first value e1 at the free end 9 to a second value e2, greater than e1, at the fixing end 5, whereas the internal radius R of the hollow shell decreases from a first value R1 at the free end 9 to a second value R2, smaller than R1, at the fixing end 5.

Figure 10:
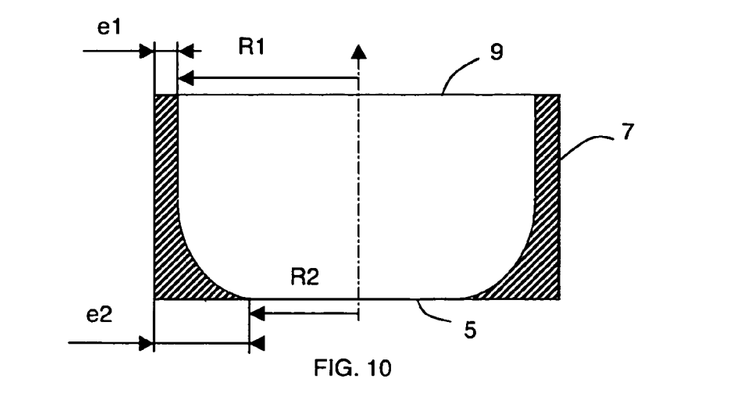

FIG. 10 represents a vibrating wall 7 of cylindrical external shape, the thickness e whereof increases from a first value e1 at the free end 9 to a second value e2, greater than e1, at the fixing end 5. The internal radius R of the hollow shell decreases from a first value R1 at the free end 9 to a second value R2, smaller than R1, at the fixing end 5. In this embodiment, unlike the vibrating walls according to FIGS. 7 and 9 in which the thickness e increases or decreases linearly, this change of thickness is non-linear and the internal face of the hollow shell is curved at the level of the fixing end 5.

FIG. 11 represents a vibrating wall 7 of cylindrical external shape, the thickness e whereof changes linearly, so that the internal face of the vibrating wall 7 also has a truncated conical shape. The thickness e of the hollow shell thus increases from a first value e1 at the free end 9 to a second value e2, greater than e1, at the fixing end 5, whereas the internal radius R of the hollow shell decreases from a first value R1 at the free end 9 to a second value R2, smaller than R1, at the fixing end 5.

FIG. 12 represents a vibrating wall 7 the thickness e whereof changes non-linearly. The thickness of the vibrating wall 7 keeps a first value e1 from the free end 9 and over substantially a half of the height H, and then increases to a second value e2, greater than e1, at the fixing end 5. The internal radius R decreases also in non-linear manner from a first value R1, at the free end 9 and over substantially a half of the height H, to a second value R2, smaller than R1, at the fixing end 5.

In all the figures described above, the height H, corresponding to the depth of the vibrating wall 7 is invariant, whatever the shape of the vibrating structure 4. Micro-machining is thus facilitated, which reduces the manufacturing cost.

The vibrating structure 4 according to FIGS. 6 and 13, i.e. with a vibrating wall 7 of cylindrical shape and constant thickness, is the simplest possible in terms of manufacturing. As illustrated in FIGS. 7 to 12, it is possible to make the thickness e of the vibrating wall 7 vary along the height H, from a first is value e1 at the level of the free end 9 to a second value e2 at the level of the fixing end 5 (FIGS. 7, 9-12). The thickness e of the side wall can vary linearly (FIGS. 7, 9 and 11) or not (FIG. 10). A great decoupling efficiency can thus be obtained over a small depth H.

Figure 14:
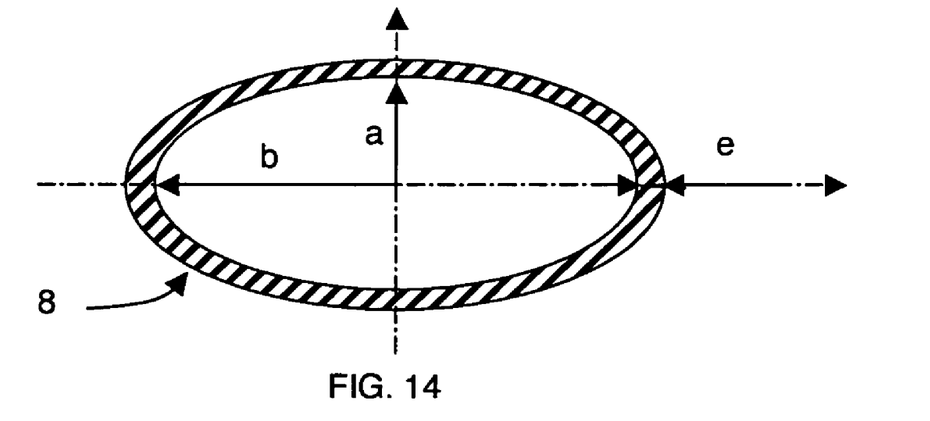

Although the base 8 of the vibrating wall 7 according to the FIGS. 6 to 13 is circular, of internal radius R and thickness e, the invention also applies to vibrating walls 7 the base 8 whereof has a non-circular cross-section. Indeed, it is possible to draw any geometry on the etching masks, in the case of etching using reactive gases. For example, as represented in FIG. 14, the base 8 can be elliptical in shape, with a thickness e and characteristic parameters a and b, respectively for the small axis and the large axis of the internal cross-section of the vibrating wall 7. According to FIG. 15, the base 8 can also be formed by a rectangular-shaped ring of length L, width I and thickness e.

Optimization of the dimensions of a vibrating structure 4 according to FIGS. 4 and 5 uses known mathematical formulations for calculating the structures of the cylindrical shells. These formulations may however be applied to much more various shapes, in particular to all the hollow shells according to FIGS. 7 to 12. In this case, it is possible either to write and solve the corresponding system of equations analytically or to use numerical resolution methods by finite elements if the structures are too complex.

The deformation and vibration equations of the shells are described in very general manner in the publication by Y. M. Fu and C. P. Chen entitled "Non-linear vibration of elastic truncated conical moderately thick shells in large overall motion" (International Journal of Non-Linear Mechanics; July 2001; 36 (5); pp 763-771). Fu & Chen's calculation describes the vibratory behaviour of a structure with a truncated conical shell. This calculation can be adapted for a cylindrical shell, in particular for calculating the thickness of the wall of the cylinder where the vibrations take place near the free end 9. The shape of the vibrating structure 4 is then deduced by association, from the calculation described in the publication by Fu & Chen, of the choice of thicknesses of the vibrating wall 7 of the hollow shell and of calculation of the radii of the base 8 and of the free end 9 of the hollow shell.

The vibrating structure 4 can be produced by simple etching in a substrate, for example a substrate made from silicon (Si), from silicon on insulator (SOI), or a substrate bearing epitaxied secondary layers. The thickness of the substrate fixes the maximum height H of the vibrating structure 4. The vibrating wall 7 and the fixed support 6 are thus formed by a single part. According to the shape of the vibrating structure 4, etching can be performed in a single step with a single masking level, or in several steps with several masking levels, the etchings already made then being protected by a sacrificial layer, for example a dielectric of oxide, nitride or thick resin type, before etching of the next level is performed. For example, anisotropic etching of RIE type, i.e. reactive ion etching in a single step, can be used to produce a vibrating wall 7 with perfectly vertical sides (FIG. 6), or with non-vertical sides (FIGS. 12). In the latter case, the etching conditions simply have to be modified in situ to go from one zone to the next.

A vibrating wall 7 according to FIG. 10 can be produced in two steps by wet isotropic etching or RIE type, followed by anisotropic etching of the RIE type.

Figure 15:
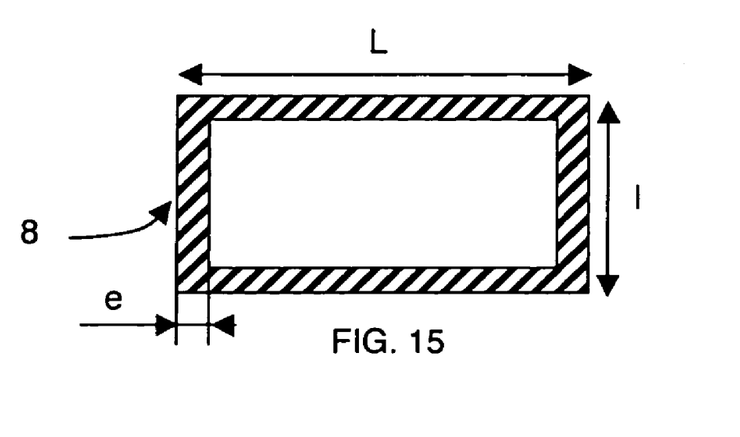

The succession of wet anisotropic etching, for example by means of potassium hydroxide (KOH), and RIE anisotropic etching can be used to produce a vibrating wall 7 according to FIG. 9 with a square or rectangular base 8 according to FIG. 15.

Numerous other combinations of the different etching techniques can be performed, thus enabling a large number of vibrating walls 7 of different shapes to be achieved.

Figure 17:
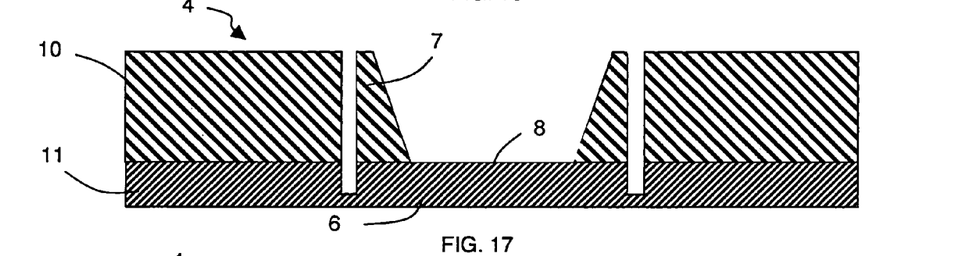
Figure 18:
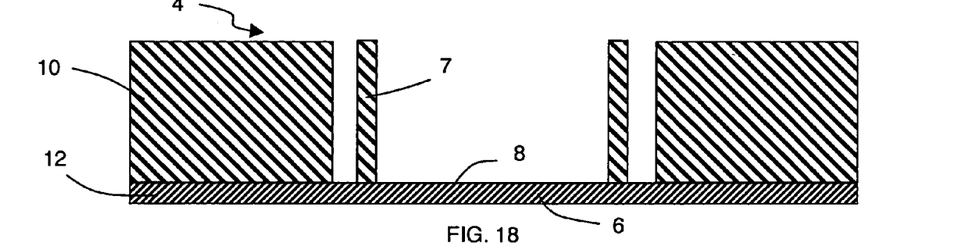
Figure 19:
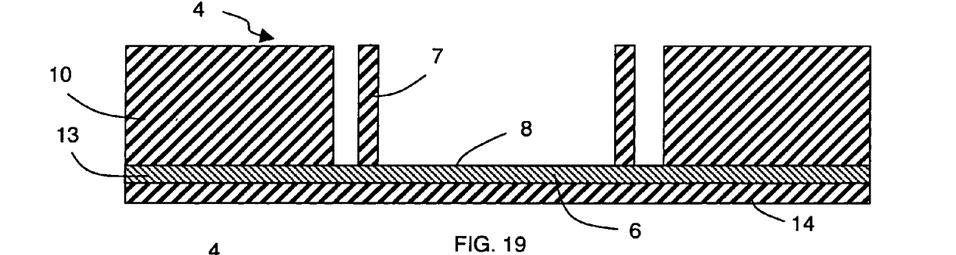
Figure 20:
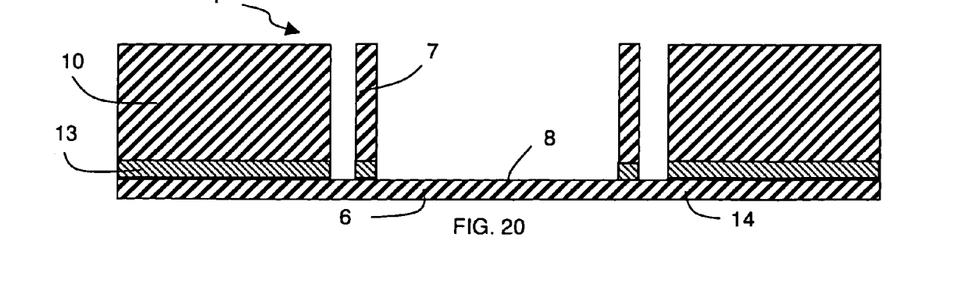

Different embodiments of the vibrating structure 4 will be described in relation to FIGS. 16 to 20 which respectively illustrate fabrication of vibrating walls 7 according to FIG. 12 (FIG. 16), according to FIG. 9 (FIG. 17) and according to FIG. 6 (FIGS. 18 to 20).

Figure 16:
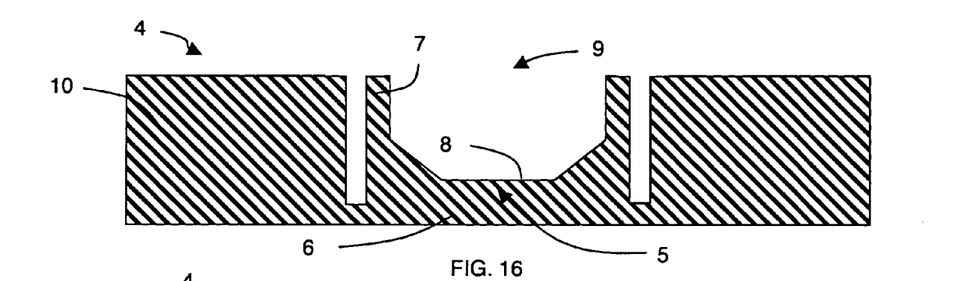
FIGS. 16 to 20 illustrate particular modes of manufacturing of the vibrating structure according to the invention.

In FIG. 16, the vibrating structure 4 is etched in a bulk silicon substrate 10. Each etching step is terminated after a preset time according to the shape chosen. The bottom part of the substrate 10 then forms the fixed support 6 of the vibrating structure 4.

In FIG. 17, the bulk silicon substrate 10 comprises an over-doped zone 11, at the bottom part of the substrate in the embodiment represented, this zone having a thickness that is substantially equivalent to or less than one third of the thickness of the substrate 10. Nevertheless, the thickness of the over-doped zone 11 must be sufficient for the substrate 10 to remain sufficiently rigid. For example, the thickness of the over-doped zone is about 50 µm to 100 µm. The over-doped zone 11 is produced by implantation and annealing from one face of the substrate 10 (bottom face in the example represented). Etching of the internal face of the vibrating structure 4 is then performed from the other face, preferably by wet etching, for example by means of KOH etching. The local over-doping properties of the substrate 10 are in fact then used to automatically create stopping of electrochemical etching at the level of the over-doped zone 11. The over-doped zone 11 thus constitutes the fixed support 6 of the vibrating structure 4.

In FIG. 18, an etching stop layer 12 is provided under the substrate 10. The layer 12 is preferably formed by a dielectric of silicon oxide type ($SiO_2$), as it presents a good selectivity with respect to silicon and is not a source of pollution of the equipment. The vibrating structure 4 is then etched in the whole thickness of the substrate 10 and the etching stop layer 12 constitutes the fixed support 6 of the vibrating structure 4.

In FIG. 19, the substrate 10 is a silicon on insulator (SOI) substrate. It comprises an intermediate layer 13 of buried silicon oxide ($SiO_2$). The structure is etched in the thick part of the substrate 10 and etching is stopped on the buried silicon oxide layer 13. The layer 13 thus constitutes the fixed support 6 of the vibrating structure 4. This fabrication method is particularly well-suited to micro-machining technologies above IC, in which the integrated circuit or circuits are fabricated first and are then protected while fabrication of the sensor or actuator is performed. A thin film 14 of the silicon substrate 10 situated under the intermediate layer 13 in fact enables other functions to be integrated in the component thus formed, for example control and/or read integrated circuits. The contacts between the thin film 14 and the thick part of the substrate 10 are made by any suitable known method enabling the potentials of the machined structure to be fixed.

The fabrication method represented in FIG. 20 differs from the one represented in FIG. 19 by an additional etching step of the buried silicon oxide layer 13. This etching enables gravure the stray effects and stresses between the thin film 14 and the vibrating structure 4 etched in the thick part of the substrate 10 to be reduced. It is then the thin film 14 that constitutes the fixed support 6 of the vibrating structure 4.

In all cases, the hollow shell enables, in spite of the short length thereof, effective decoupling of the fixing end 5 with respect to the free end 9. The decoupled zone is not a non-punctual deformation node and the fixing end 5 can be securely connected, over the whole circumference thereof, to the substrate 10 that supports it.

The vibrating structure 4 described above notably presents the following advantages:
  it enables progressive waves to be confined in its useful part,
  the energy loss is negligible in its fixed support 6 and, on the contrary, the energy provided by the excitation means is concentrated in its useful part,
  the response of the vibrating structure 4 is independent of the stress conditions which develop in its fixed support 6 arising from the assembly conditions, from the use of the structure or from the variations of the environment variables, the vibrating structure 4 is very compact, which enables micro-machining and reduces the production cost.

Fabrication of a micro-gyroscope comprising a vibrating structure according to the invention will be described in greater detail with regard to FIGS. 21 to 25.

Figure 21:
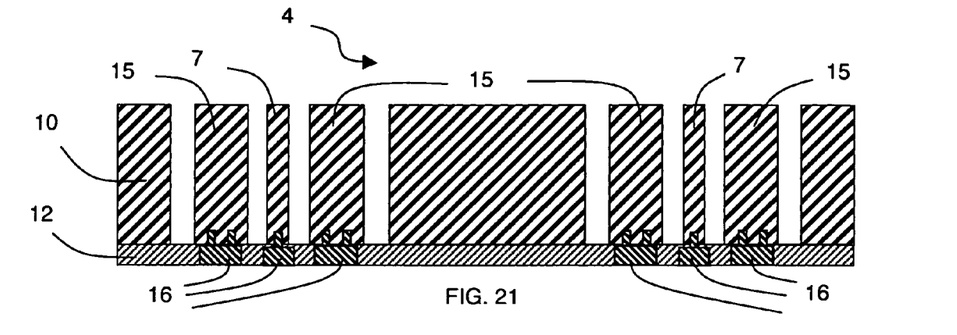
FIGS. 21 to 25 illustrate several embodiments of a micro-gyroscope comprising a vibrating structure according to the invention.
Figure 22:
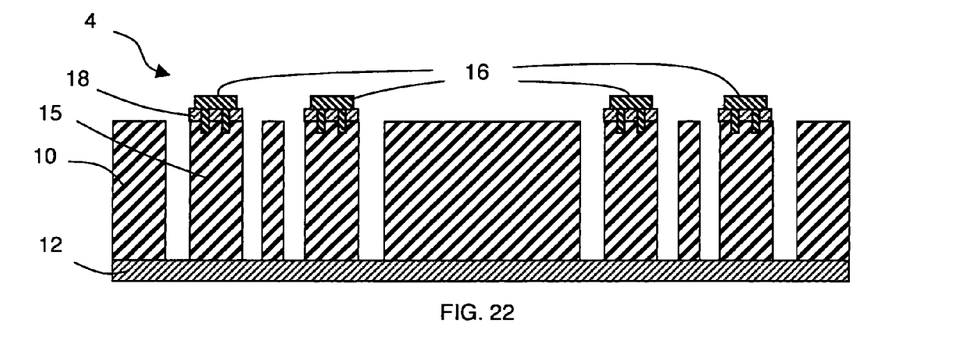

In FIGS. 21 and 22, as in FIG. 18, an oxide layer 12 is made under the substrate 10 to delineate the etching stop zone. The vibrating structure 4, for example of cylindrical shape, and electrodes 15, arranged for example on each side of each vibrating wall 7 of the vibrating structure 4, are etched simultaneously so as to form silicon blocks insulated from one another. The assembly is completed by surface metallization 16 of the electrodes 15 and of the vibrating walls 7. This metallization 16 serves the purpose of fixing the potential to ground or to another element according to the application envisaged. Metallization can be performed either on the rear face, through openings formed in the oxide layer 12 (FIG. 21), or on the front face. In this case, an oxide layer 18 at the free end of the electrodes 15 is formed to obtain a better adherence of the metal 16 on the silicon composing the electrodes 15 (FIG. 22). Metallization 16 is performed for example by deposition, masking, lithography and selective etching of the substrate 10. It is also possible to perform metallization 16 after deep etching of the vibrating walls 7 of the vibrating structure 4 by using a mechanical mask (not represented) which protects the zones that are not to be metallized. Deep etchings of the substrate 10 can be performed after metallization 16 protecting the latter if necessary by a sacrificial layer (not represented).

The embodiment represented in FIG. 21 is preferred to the one represented in FIG. 22, as any other material than silicon, deposited on the useful zone of the electrodes 15, degrades the quality coefficient of the resonator very greatly.

A micro-gyroscope can thus be achieved with a single substrate 10. It then simply has to be integrated in a case, excitation means of the vibrating structure 4 and wave means be added, and wiring be performed between the electrodes 15 and case.

Figure 23:
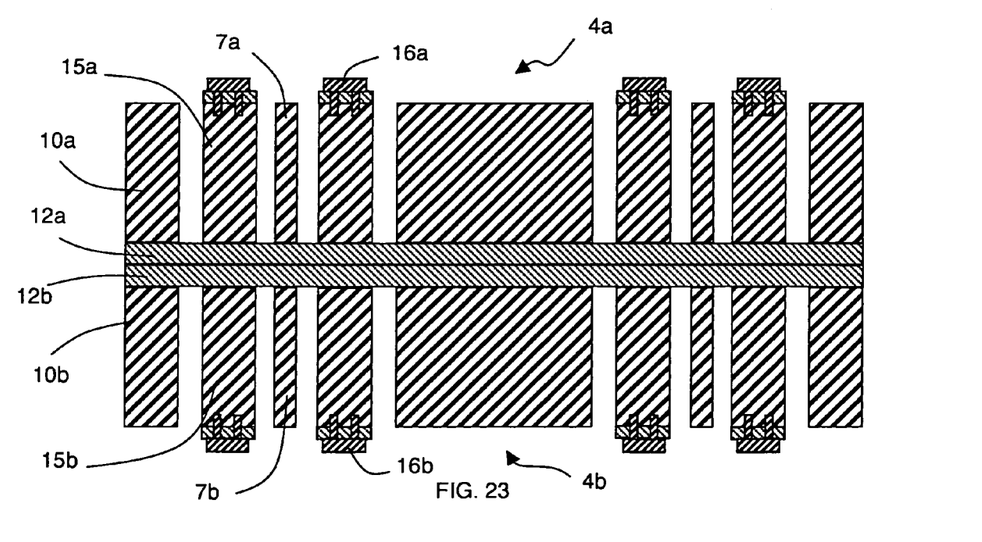

In an alternative embodiment represented in FIG. 23, two substrates 10a and 10b, etched and metallized as in FIG. 22, are then sealed by their oxidized faces 12a and 12b before being housed inside the case. The two substrates 10a and 10b are then arranged symmetrically with respect to their oxidized faces 12a and 12b, which constitute the fixed support of the corresponding vibrating structures 4a et 4b. Sealing can be performed before etching of the vibrating walls 7a and 7b and of the electrodes 15a and 15b. The symmetrical structure is then incorporated in a case and connected to the wiring and to excitation means of the structure and wave detection means to achieve the micro-gyroscope. Such a symmetrical structure in particular enables contributions to the mechanical noise to be minimized and the signal sought for to be distinguished from the stray signals.

Figure 24:
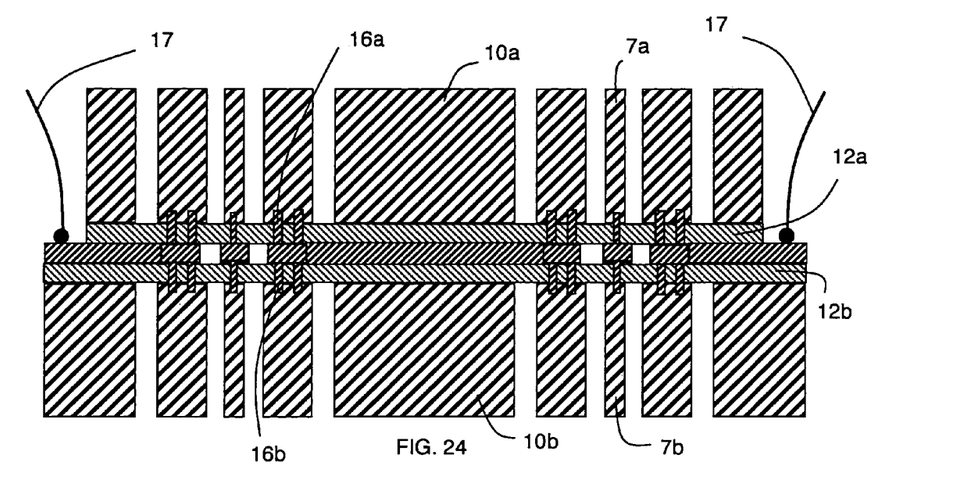
Figure 25:
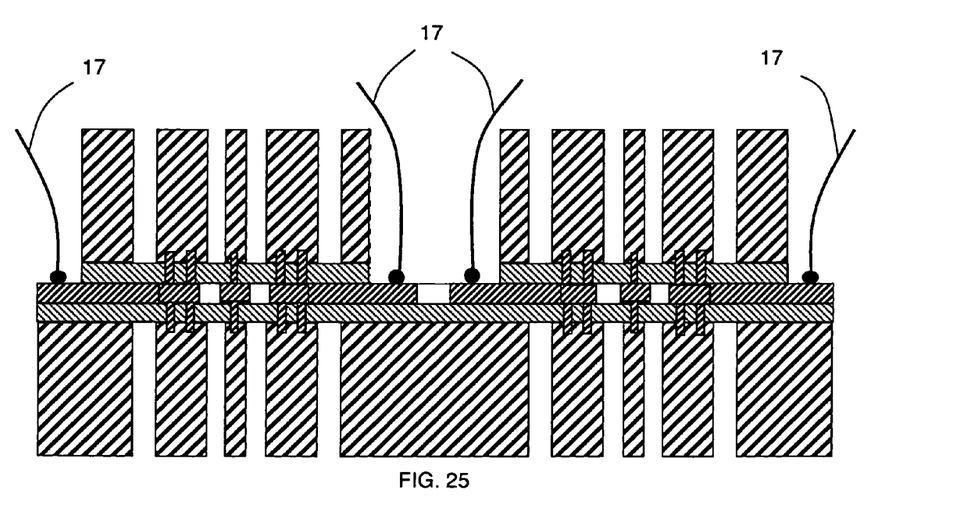

In like manner, a symmetrical structure can be achieved, as represented in FIG. 24, with metallizations 16a and 16b on the rear faces of the substrates 10a and 10b, between the two oxide layers 12a and 12b, i.e. from two substrates of the type represented in FIG. 21. In this case, one of the two substrates is etched such as to be able to perform wiring 17 of the different electrodes. In FIG. 24, the substrate 10a is etched on its periphery and wiring 17 is performed on the circumference of the structure. It is also possible to perform wiring 17 both on the circumference of the structure and on the central part of the substrate 10a (FIG. 25) or only on the central part (not represented), to obtain a more compact component.

The resolution of a gyroscope comprising a cylindrical vibrating structure according to the invention can be about 100 times greater than that of known gyroscopes.

The invention is not limited to the particular embodiments described above. In particular, the vibrating structure can be incorporated in any type of vibrating resonator. In symmetrical structures, the electrodes of the two substrates do not necessarily have to be connected together. It is also possible to insert independent sealing surfaces.

The invention claimed is:

1. Micro-machined vibrating structure comprising a fixing end, connected in secured manner to a fixed support, and at least one vibrating wall, in which progressive or stationary waves are generated and comprising a base and a free end, the vibrating wall being formed by a side wall of a hollow shell, vibrating structure wherein the fixing end is formed by the base of the hollow shell, a naturally decoupled zone being situated between the fixing end and the free end of the vibrating wall, wherein the vibrating wall is made in a silicon substrate and the fixed support is formed by an over-doped layer of the substrate.

2. Vibrating structure according to claim 1, wherein the side wall of the hollow shell has a constant thickness.

3. Vibrating structure according to claim 1, wherein the side wall of the hollow shell has a variable thickness, from a first value at the free end to a second value, greater than the first value, at the base of the hollow shell.

4. Vibrating structure according to claim 3, wherein the thickness of the side wall of the hollow shell varies linearly between the free end and the base of the hollow shell.

5. Vibrating structure according to claim 1, wherein the external face of the side wall of the hollow shell is cylindrical.

6. Vibrating structure according to claim 1, wherein the external face of the side wall of the hollow shell is tapered.

7. Vibrating structure according to claim 1, wherein the base of the side wall of the hollow shell has a predetermined thickness and a circular cross-section of predetermined radius.

8. Vibrating structure according to claim 1, wherein the base of the side wall of the hollow shell has a predetermined thickness and an elliptical cross-section.

9. Micro-machined vibrating structure comprising a fixing end, connected in secured manner to a fixed support, and at least one vibrating wall, in which progressive or stationary waves are generated and comprising a base and a free end, the vibrating wall being formed by a side wall of a hollow shell, vibrating structure wherein the fixing end is formed by the base of the hollow shell, a naturally decoupled zone being situated between the fixing end and the free end of the vibrating wall, wherein the vibrating wall is made in a silicon substrate and the fixed support is formed by a silicon oxide layer formed under the substrate.

10. Vibrating structure according to claim 9, wherein the side wall of the hollow shell has a constant thickness.

11. Vibrating structure according to claim 9, wherein the side wall of the hollow shell has a variable thickness, from a first value at the free end to a second value, greater than the first value, at the base of the hollow shell.

12. Vibrating structure according to claim 11, wherein the thickness of the side wall of the hollow shell varies linearly between the free end and the base of the hollow shell.

13. Vibrating structure according to claim 9, wherein the external face of the side wall of the hollow shell is cylindrical.

14. Vibrating structure according to claim 9, wherein the external face of the side wall of the hollow shell is tapered.

15. Vibrating structure according to claim 9, wherein the base of the side wall of the hollow shell has a predetermined thickness and a circular cross-section of predetermined radius.

16. Vibrating structure according to claim 9, wherein the base of the side wall of the hollow shell has a predetermined thickness and an elliptical cross-section.

17. Micro-machined vibrating structure comprising a fixing end, connected in secured manner to a fixed support, and at least one vibrating wall, in which progressive or stationary waves are generated and comprising a base and a free end, the vibrating wall being formed by a side wall of a hollow shell, vibrating structure wherein the fixing end is formed by the base of the hollow shell, a naturally decoupled zone being situated between the fixing end and the free end of the vibrating wall, wherein the vibrating wall is made in a silicon substrate and the fixed support is formed by a silicon oxide layer buried in the substrate.

18. Vibrating structure according to claim 17, wherein the side wall of the hollow shell has a constant thickness.

19. Vibrating structure according to claim 17, wherein the side wall of the hollow shell has a variable thickness, from a first value at the free end to a second value, greater than the first value, at the base of the hollow shell.

20. Vibrating structure according to claim 19, wherein the thickness of the side wall of the hollow shell varies linearly between the free end and the base of the hollow shell.

21. Vibrating structure according to claim 17, wherein the external face of the side wall of the hollow shell is cylindrical.

22. Vibrating structure according to claim 17, wherein the external face of the side wall of the hollow shell is tapered.

23. Vibrating structure according to claim 17, wherein the base of the side wall of the hollow shell has a predetermined thickness and a circular cross-section of predetermined radius.

24. Vibrating structure according to claim 17, wherein the base of the side wall of the hollow shell has a predetermined thickness and an elliptical cross-section.

25. Micro-machined vibrating structure comprising a fixing end, connected in secured manner to a fixed support, and at least one vibrating wall, in which progressive or stationary waves are generated and comprising a base and a free end, the vibrating wall being formed by a side wall of a hollow shell, vibrating structure wherein the fixing end is formed by the base of the hollow shell, a naturally decoupled zone being situated between the fixing end and the free end of the vibrating wall, wherein at least the bottom part of the side wall of the hollow shell has a symmetrical truncated conical shape, with a thickness varying from a first value at the free end to a second value, greater than the first value, at the base of the hollow shell.

26. Vibrating structure according to claim 25, wherein the vibrating wall is made in a silicon substrate.

27. Micro-gyroscope comprising at least one vibrating structure according to claim 25, and electrodes formed in the same substrate as the vibrating wall of the vibrating structure.

28. Micro-gyroscope according to claim 25, comprising two symmetrically arranged vibrating structures and sealed by their respective fixed supports.

29. Vibrating structure according to claim 25, wherein the side wall comprises a cylindrical part above the bottom part.

30. Vibrating structure according to claim 25, wherein the side wall has a circular cross-section.

31. Vibrating structure according to claim 25, wherein the side wall has an elliptical circular cross-section.

\* \* \* \* \*